United States Patent [19]

Mallory

[11] Patent Number: 4,499,525

[45] Date of Patent: Feb. 12, 1985

[54] CONSTANT ILLUMINATION FLASHLIGHT

[75] Inventor: Henry R. Mallory, Greenwich, Conn.

[73] Assignee: Duracell Inc., Bethel, Conn.

[21] Appl. No.: 331,432

[22] Filed: Dec. 16, 1981

[51] Int. Cl.³ ............................................. F21V 23/00
[52] U.S. Cl. .................................. 362/157; 315/307; 323/299
[58] Field of Search ............... 320/2, 13, 21; 323/282, 323/284, 299; 362/205, 206, 208, 157; 363/124; 315/307, 310, 311

[56] References Cited

U.S. PATENT DOCUMENTS

| | | | |
|---|---|---|---|
| 3,525,924 | 8/1970 | Atterholt | 323/282 |
| 3,777,247 | 12/1973 | Zellmer | 320/21 X |
| 4,144,557 | 3/1979 | Kerr et al. | 362/208 X |
| 4,230,970 | 10/1980 | Potter et al. | 323/299 X |
| 4,237,405 | 12/1980 | Kellis | 323/299 X |
| 4,242,629 | 12/1980 | Shuey | 323/282 |
| 4,326,161 | 4/1982 | Kreinberg | 323/299 |

Primary Examiner—William H. Beha, Jr.
Attorney, Agent, or Firm—Ronald S. Cornell; Israel Nissenbaum

[57] ABSTRACT

A power supply circuit for generating a power pulse train for an incandescent bulb in a flashlight which results in a relatively constant illumination output from the flashlight despite the decline in output voltage from a battery power supply therefor during discharge. The power supply circuit operates to compensate for the lower output voltage from the battery power supply by increasing the duty cycle of the pulse train to provide wider pulse widths therein, and eventually the wider pulse widths merge into a DC power supply near the end of the useful service life of the battery power supply.

2 Claims, 3 Drawing Figures

CONSTANT ILLUMINATION FLASHLIGHT

BACKGROUND OF THE INVENTION

1. Field of the Invention

The present invention relates generally to a flashlight for providing a relatively constant illumination output over the useful service life of batteries employed therein despite the relatively poor voltage maintenance characteristics of the batteries during discharge. More particularly the subject invention pertains to a simple and inexpensive circuit for incorporation in a flashlight which provides a relatively constant power supply to an incandescent bulb therein over substantially the entire useful service life of the flashlight batteries. The circuit generates a pulse train for the incandescent lamp and provides a relatively constant power supply by varying the duty cycle thereof by generating pulses having a greater pulse width as the voltage from the power supply batteries declines.

2. Discussion of the Prior Art

Traditional batteries employed as a power supply for incandescent flashlights have very poor voltage maintenance characteristics over their useful service life. Traditional batteries of the kind discussed herein typically include aqueous electrolyte, manganese dioxide batteries such as zinc carbon or zinc chloride batteries or manganese alkaline batteries. As an example, a conventional zinc carbon commercially designated 908 battery provides only four to four and one half hours of continuous service, with an initial illumination output of forty-five lumens and a change in illumination over its useful life of approximately five to one, thereby producing an output near the end of its service life of only nine lumens. Moreover, as the battery discharges the lower voltage results in a substantial filament color change in the incandescent bulb from an initial white light output to a noticeably yellow light output, which is considered to be a negative factor from a consumer acceptance point of view.

Lithium based batteries now under extensive development in the art do not exhibit a four or more to one ratio decline in output voltage over their useful service life because of voltage maintenance characteristics which are vastly superior to zinc carbon, zinc chloride and manganese alkaline batteries. In view thereof, it would be desirable to provide a development such that traditionally powered flashlights remain competitive with the newly developing lithium powered lighting products.

SUMMARY OF THE INVENTION

Accordingly, it is a primary object of the present invention to provide a power supply circuit operated from a battery power supply which provides a relatively constant power output to a load over substantially the entire useful service life of the battery despite the relatively poor voltage maintenance characteristics thereof during discharge.

A further object of the subject invention is the provision of a circuit of the aforementioned type designed to power a load in the form of an incandescent bulb for a flashlight such that the result is a relatively constant illumination output from the flashlight over the useful service life of the batteries employed therein.

Yet another object of the present invention is a power supply circuit of the subject kind which operates almost entirely in a substantially nondissipative manner, thereby resulting in a power supply circuit having very little internal power loss.

In accordance with the teachings herein, the present invention provides a circuit for generating a power pulse train for a load in the form of an incandescent bulb in a flashlight which results in a relatively constant illumination output from the flashlight despite the decline in output voltage from a battery power supply therefor during discharge. The power supply circuit basically operates to compensate for the lower output voltage from the battery power supply by increasing the duty cycle of the pulse train to provide wider pulse widths therein, and eventually the wider pulse widths merge into a DC power supply near the end of the useful service life of the battery power supply.

The circuit includes a drive transistor having its emitter and collector coupled in series with the incandescent bulb and the battery power supply. A control circuit is coupled to the base of the drive transistor in a manner to cause it to generate a pulse train in which the duty cycle thereof is increased by providing pulses having a greater pulse width as the voltage from the battery power supply declines during discharge. In this arrangement the rated voltage of the incandescent lamp is preferably approximately half the rated voltage of the battery supply, which is normally an aqueous electrolyte manganese dioxide battery. The drive transistor is selected to have a high beta characteristic and is driven in a nondissipative mode in which it is either in a fully conductive, saturated state or in a nonconductive state, such that power dissipation in the drive transistor in partially conductive modes is avoided.

In a preferred embodiment, the control circuit comprises first and second control transistors coupled together in a complementary manner such that only one control transistor is conducting at a time. An output of the first control transistor is coupled to the base of the drive transistor to drive it in a saturated mode when the first control transistor is conducting. The second transistor functions as an inhibit transistor having an output thereof coupled to the base of the first control transistor to render it nonconductive when the inhibit transistor is conducting. An RC timing network is coupled to the base of the inhibit transistor to control the frequency of the pulse train generated by the circuit. In greater detail, the drive transistor comprises an NPN transistor, and the first and second control transistors are PNP transistors coupled in a common emitter circuit. The common emitter connection is coupled directly to the anode of the battery while the collector of the first control transistor is coupled to the base of the drive transistor. At least one diode functions as a voltage threshold circuit, and is coupled between the collector of the drive transistor and the base of the inhibit transistor, such that when the voltage of the threshold circuit is exceeded, the inhibit transistor is turned on, which results in both the first control transistor and the drive transistor being rendered nonconductive.

BRIEF DESCRIPTION OF THE DRAWINGS

The foregoing objects and advantages of the present invention for a circuit for a constant illumination flashlight may be more readily understood by one skilled in the art with reference being had to the following detailed description of several preferred embodiments thereof, taken in conjunction with the accompanying drawings, in which.

DETAILED DESCRIPTION OF THE DRAWINGS

Figure 1:
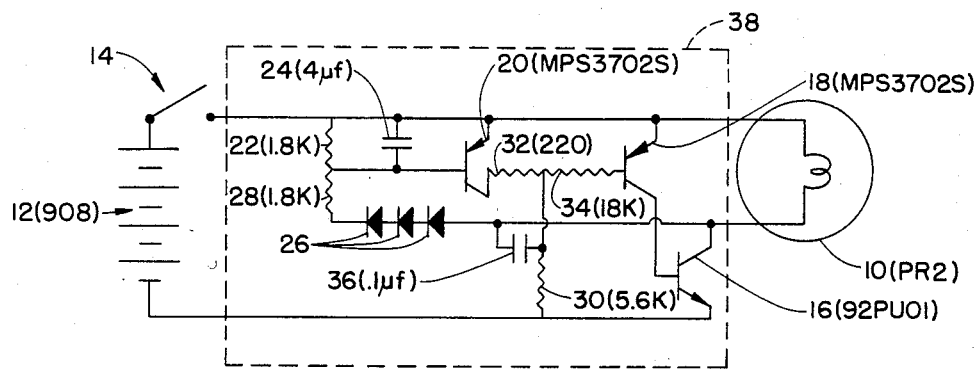
FIG. 1 is an electrical schematic of a first embodiment of a circuit for a constant illumination flashlight constructed pursuant to the teachings of the present invention.

Referring to the drawings in detail, FIG. 1 is an electrical schematic of a first embodiment of a circuit designed to provide a substantially constant power output to a load in the form of an incandescent bulb 10, which in this embodiment is a commercially designated PR2 bulb in standard usage in two D cell flashlights. A PR2 bulb is normally rated at 2.38 volts and 500 milliamps. The power supply therefor in this circuit is a 6 volt manganese dioxide battery 12, commercially designation 908, which is a typical commercially available lantern battery with spring contacts on top thereof. The battery 12 is connected in series with bulb 10 through an on-off switch 14 and the emitter and collector of an NPN drive or pass transistor 16, commercial designation 92PU01. In an arrangement of this type, the lamp 10 is selected to have approximately one half the rated voltage of the battery, primarily because operation is in a pulsed mode rather than a typical prior art DC mode.

Transistor 16 is selected to have a high beta ($\beta$) characteristic, and its base current required during conduction is approximately 10% of its emitter to collector current, which in the operation of the disclosed circuit is less than 500 milliamps. Accordingly, a base current of 50 milliamps or less is sufficient to cause fully saturated conduction of the transistor 16.

The pulsed conduction of transistor 16 is controlled by a circuit including first and second control transistors 18 and 20 which are connected in a common emitter arrangement, with the common emitters being coupled directly to the positive terminal or anode of battery 12. The control transistors 18 and 20 are connected together in a complementary manner such that only one transistor at a time is conducting. The first control transistor 18 is coupled by its collector to the base of drive transistor 16 to turn the latter on in a fully saturated, conductive mode when control transistor 18 is conducting. Transistor 18 is selected to supply an emitter current of 50 milliamps or less to the base of drive transistor 16 to drive the latter in a fully saturated mode. The second control transistor 20 functions as an inhibit transistor relative to the first control transistor 18, with the collector of inhibit transistor 20 being coupled to the base of the first control transistor 18 to render the latter nonconductive when inhibit transistor 20 is conducting. Commercially designated MPS3702S PNP transistors are suitable for the first and second control transistors 18 and 20.

An RC timing network comprising resistor 22 and capacitor 24 is coupled to the base of inhibit transistor 20, and their values control the frequency of the pulse train generated by the power supply circuit. The frequency of the pulse train should be higher than the retinal persistence of the human eye such that it appears to the user of the flashlight that the illumination therefrom is constant. In general, the frequency of the generated pulse train should be greater than 50 hertz, and 5 kilohertz is a good practical frequency for a flashlight power supply circuit of this type. In the illustrated embodiment resistor 22 is rated at 1.8 kilo-ohms while capacitator 24 is rated at 5 microfarads and 3 volts.

A voltage threshold circuit in the form of three diodes 26 is coupled between the collector of drive transistor 16 and the base of inhibit transistor 20, and functions in a manner to turn inhibit transistor 20 on when the voltage at the drive transistor 16 exceeds the predetermined threshold of the diodes 26. In this circuit each diode 26 has a threshold of 0.8 volts, and accordingly the cumulative threshold voltage of the three diodes in series is 2.4 volts. In alternative embodiments, other types of threshold circuits could be utilized. For example, each diode could have a lesser or greater threshold voltage, and more or less diodes could be utilized, or in some circuits zener diodes may be suitable.

The resistors 28, 30, 32 and 34 are selected to establish suitable biasing voltages throughout the circuit, and their values in this circuit are shown in parentheses in FIG. 1. A capacitor 36 has been added to the circuit as it results in improved performance thereof, but is not necessary for its operation. The constant power supply circuit of the present invention is shown in FIG. 1 as being encompassed by dashed line 38, while the more conventional components of a flashlight are shown outside the dashed line 38. However, it should be realized that in a conventional flashlight, a PR2 bulb would not be utilized with a 908 battery as this type of bulb is not designed to accept the full DC power of a fully charged 908 battery.

The circuit operates as follows. Closure of switch 14 applies operational voltages to transistor 18 which results in its conduction and the application of a conductive voltage and current to the base of drive transistor 16, which results in it being switched into a saturated conductive state, thereby applying almost the full voltage of battery 12 (minus a small voltage drop of approximately ¼ volt across transistor 16) across lamp 10 at the leading edge of a pulse in the pulse train. Transistor 16 continues conducting until the voltage at its collector exceeds the threshold of 2.4 volts of the three series connected diodes 26, at which time an activating voltage is applied through diodes 26 and resistor 28 to the base of inhibit transistor 20, thereby causing saturated conduction of transistor 20 and also charging of capacitor 24. Conduction of transistor 20 applies a reverse bias to the base of control transistor 18, thereby terminating its conduction and also terminating conduction of drive transistor 16 at the trailing edge of a pulse in the pulse train. Capacitor 24 discharges through resistor 22, thereby removing the forward bias voltage from its base and terminating conduction of inhibit transistor 20. Termination of conduction of inhibit transistor 20 allows control transistor 18 to conduct again, thereby driving transistor 18 into saturated condition at the leading edge of the next pulse in the pulse train, etc.

The circuit continues supplying a power pulse train to lamp 10 in this manner as the voltage supplied by battery 12 gradually declines because of its constant discharge. A decline in voltage of battery 12 results in a decrease in the amplitude of the voltage of each pulse (as that amplitude is slightly less than the voltage supplied by battery 12). However, a decline in voltage of battery 12 also results in a concurrent increase in the time duration after initiation of the leading edge of a pulse, for the collector of transistor 16 to reach the threshold voltage across diodes 26, and hence a concurrent increase of the pulse width of each pulse in the train. The increase in pulse width increases the duty cycle of the pulse train and compensates for the lowering of the voltage amplitude of the pulse train, such that a substantially constant amount of power is supplied to incandescent lamp 10 despite the gradual decline in voltage supplied by battery 12 as it discharges. The pulse width of each pulse will gradually increase until the battery voltage declines to a point (at substantially the end of its useful service life) at which the threshold of diodes 26 is not exceeded, thereby resulting in continuous conduction of drive transistor 16. After reaching this point, the circuit cannot compensate for a further decline in the output voltage of battery 12, thereby resulting in a gradual decrease in the power supplied to lamp 10.

The following Table I supplies technical data on the operation of the circuit of FIG. 1. This data was derived from measuring the illumination output of bulb 10, the voltage output of battery 12 and the frequency of the output pulse train. The average current of the pulse train and the power figures were then computed on the basis of these measurements.

TABLE I

| Volts | MA | Watts | Khz | Lumens | Lumens per Watt |
|-------|-----|-------|-------|--------|------|
| 6.3 | 228 | 1.44 | 5.2 | 10.8 | 7.5 |
| 6.0 | 235 | 1.41 | 5.2 | 10.3 | 7.3 |
| 5.5 | 245 | 1.35 | 5.7 | 9.3 | 6.89 |
| 5.0 | 262 | 1.31 | 6.1 | 8.6 | 6.56 |
| 4.0 | 310 | 1.24 | 7.2 | 7.7 | 6.21 |
| 3.0 | 412 | 1.24 | 6.5 | 7.9 | 6.37 |
| 2.5 | 498 | 1.25 | Cont. | 8.4 | 6.72 |
| 2.0 | 442 | .88 | Cont. | 3.6 | 4.09 |

Figure 2:
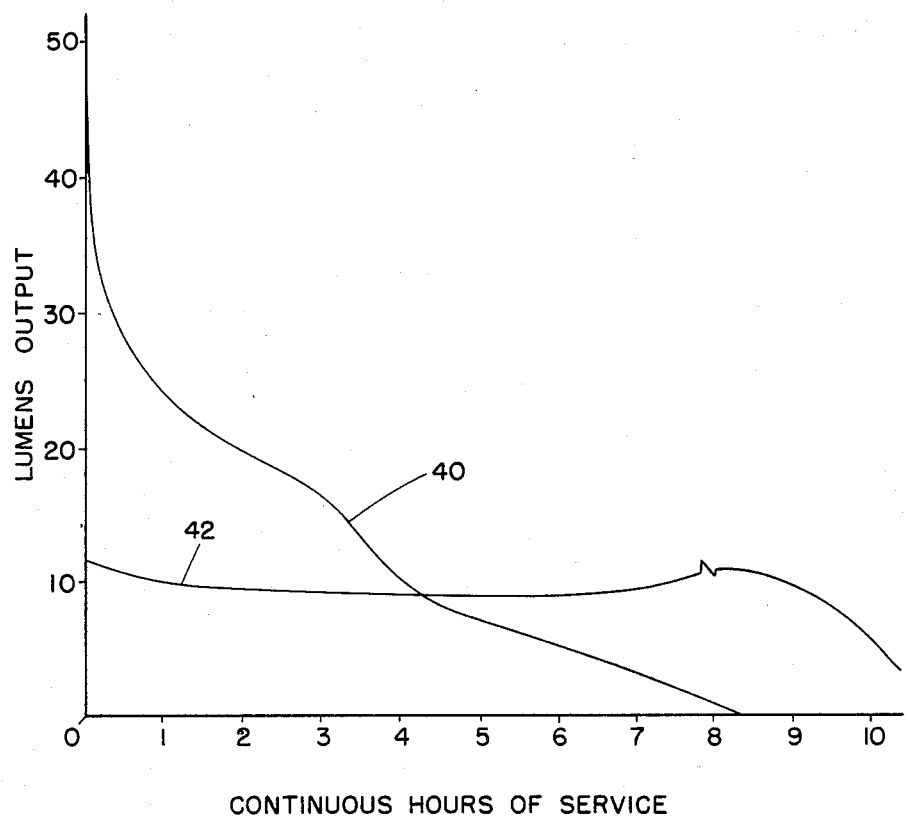
FIG. 2 illustrates two curves of illumination output versus continuous hours of service, the first of which is for a typical prior art flashlight and the second of which is for a flashlight incorporating the circuit of FIG. 1.

FIG. 2 illustrates two curves of illumination output of a flashlight bulb versus continuous hours of service. A first curve 40 shows the illumination output of a typical prior art flashlight wherein a six volt zinc carbon lantern battery, commercial designation 908, is discharged directly through a suitable incandescent lamp, such as a 908 commercial designation bulb. A second curve 42 illustrates the illumination output produced by bulb 10 in the circuit of FIG. 1. As illustrated by these curves, the constant illumination circuit produces about twice the useful service hours as the prior art approach. Of course, as also illustrated by the curves this increase in useful service hours is achieved by sacrificing the initial high illumination output produced by the prior art approach.

Figure 3:
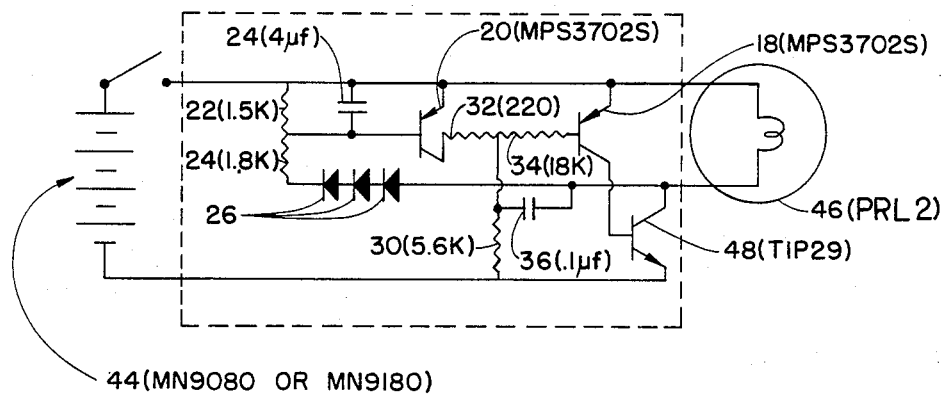
FIG. 3 illustrates an electrical schematic, with only a difference in component selection, for a second exemplary embodiment of a circuit for a constant illumination flashlight constructed pursuant to the teachings herein.

FIG. 3 is an electrical schematic of a second exemplary embodiment of a circuit for a constant illumination flashlight designed to produce slightly over twice the illumination output as the first embodiment from a six volt lantern battery 44, commercial designation MN9080 or MN9180, which is approximately twice as large as the 908 battery of the first embodiment. This circuit is designed to operate with a higher power lamp 46, commercial designation PRL2, rated at 2.75 volts and 950 milliamperes, because of the higher power throughput of the circuit. The increased current through the circuit also requires a higher power drive transistor 48, commercial designation TIP29 or equivalent. The operation of this circuit is substantially the same as the operation of the first embodiment, and accordingly will not be explained separately in detail herein. The following Table II supplies technical data on the operation of the circuit of FIG. 3. This data was derived from measuring the illumination output of lamp 46, the voltage output of battery 44, and the frequency of the output pulse train. The average current of the pulse train and the power figures were then derived from the measured parameters.

TABLE II

| BATTERY POWER SUPPLY | | | LAMP VOLTS | | | | |
|---|---|---|---|---|---|---|---|
| DC VOLTS | DC MA | DC WATTS | LUMENS | AVER. | TRUE RMS | KHZ | LUMENS WATTS |
| 6.0 | 520 | 3.12 | 24.6 | 1.54 | 2.73 | 1.00 | 7.88 |
| 5.75 | 542 | 3.12 | 23.7 | 1.58 | 2.71 | 1.05 | 7.60 |
| 5.50 | 578 | 3.58 | 23.1 | 1.63 | 2.69 | 1.02 | 6.45 |
| 5.00 | 650 | 3.25 | 22.5 | 1.76 | 2.68 | 1.08 | 6.92 |
| 4.5 | 748 | 3.37 | 22.9 | 1.96 | 2.69 | 1.12 | 6.80 |
| 4.0 | 850 | 3.40 | 24.5 | 2.27 | 2.74 | 1.06 | 7.21 |
| 3.5 | 1045 | 3.66 | 28.8 | 2.85 | 2.86 | cont. | 7.87 |
| 3.25 | 1035 | 3.36 | 24.7 | 2.74 | 2.75 | cont. | 7.35 |
| 3.0 | 998 | 2.99 | 17.2 | 2.51 | 2.52 | cont. | 5.75 |
| 2.5 | 915 | 2.29 | 6.5 | 2.02 | 2.04 | cont. | 2.84 |

While several embodiments and variations of the present invention for a circuit for a constant illumination flashlight are described in detail herein, it should be apparent that the disclosure and teachings of the present invention will suggest many alternative designs to those skilled in the art. For instance, the circuits could be easily modified to provide a flashing illumination output.

What is claimed is:

1. A portable flashlight designed to provide a relatively constant illumination output over the useful service life of the battery power supply therefor, despite a relatively poor battery maintenance characteristic during discharge, comprising an incandescent lamp for providing illumination, a circuit for providing relatively constant electrical power to the incandescent lamp over substantially the entire useful life of at least one power supply battery, having a relatively poor voltage maintenance characteristic during discharge, said circuit including a drive transistor having the incandescent lamp coupled in series with the emitter and collector of the drive transistor and further coupled in series with said battery power supply, said circuit further including a control circuit including first and second control transistors coupled in a complementary manner such that only one control transistor is conducting at a time, said first control transistor being coupled to the base of said drive transistor, to drive it into a saturated conductive mode when said first control transistor is conducting, and said second control transistor being an inhibit transistor having a drive output thereof coupled to the base of said first control transistor to turn it off when said inhibit transistor is conducting, wherein said control circuit causes said drive transistor to generate a current pulse train in which the duty cycle thereof is increased, by providing current pulses having a greater pulse width to compensate for a lesser pulse amplitude, as the voltage from the power supply declines during its discharge to provide relatively constant electrical power to the incandescent lamp over substantially the entire useful life of the battery power supply, wherein said drive transistor has a relatively high beta characteristic and is driven by said control circuit in a non-dissipative manner in substantially either a fully conductive state or a fully non-conductive state to produce the pulse train, whereby power dissipation in the drive transistor during partially conductive modes is substantially eliminated, and wherein an RC timing network is coupled to the base of said inhibit transistor for controlling the frequency of the pulse train generated by the circuit.

2. A portable flashlight as in claim 1, wherein said drive transistor comprises an NPN transistor, and said first and second control transistors comprise PNP transistors coupled in a common emitter circuit, coupled directly to the anode of said at least one battery, with the collector of said first control transistor coupled to the base of said drive transistor.

* * * * *